United States Patent
Park et al.

(10) Patent No.: US 11,815,439 B2
(45) Date of Patent: Nov. 14, 2023

(54) APPARATUS FOR SAMPLING GAS, DRONE THEREWITH AND CONTROL METHOD THEREOF

(71) Applicant: AGENCY FOR DEFENSE DEVELOPMENT, Daejeon (KR)

(72) Inventors: Myung Kyu Park, Daejeon (KR); Jong Seon Kim, Daejeon (KR); Jae Hwan Lee, Daejeon (KR); Byeong Hwang Park, Daejeon (KR); Myeong Jae Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 535 days.

(21) Appl. No.: 16/915,408

(22) Filed: Jun. 29, 2020

(65) Prior Publication Data

US 2021/0181071 A1    Jun. 17, 2021

(30) Foreign Application Priority Data

Dec. 13, 2019   (KR) .................. 10-2019-0166539
Dec. 13, 2019   (KR) .................. 10-2019-0166541

(51) Int. Cl.
| | | |
|---|---|---|
| G01N 1/22 | (2006.01) | |
| G01S 19/01 | (2010.01) | |
| G01S 1/02 | (2010.01) | |
| G01N 21/78 | (2006.01) | |
| B64C 39/02 | (2023.01) | |

(Continued)

(52) U.S. Cl.
CPC .......... *G01N 1/2273* (2013.01); *B64C 39/024* (2013.01); *G01N 21/78* (2013.01); *G01S 1/02* (2013.01); *G01S 19/01* (2013.01); *B64U 10/13* (2023.01); *B64U 2101/00* (2023.01)

(58) Field of Classification Search
CPC ...... G01N 21/75; G01N 21/766; G01N 21/77; G01N 21/78; G01N 21/783; G01N 2021/751; G01N 2021/752; G01N 2021/755; G01N 2021/7753; G01N 2021/7756; G01N 2021/7759; G01N 2021/7769; G01N 2021/7793; G01N 2021/7796

See application file for complete search history.

(56) References Cited

U.S. PATENT DOCUMENTS

| | | | | |
|---|---|---|---|---|
| 3,614,012 A | * | 10/1971 | Edelman | ............... G03B 17/30 396/389 |
| 4,115,067 A | * | 9/1978 | Lyshkow | ............ G01N 21/8483 422/86 |
| 5,912,423 A | | 6/1999 | Doughty et al. | |

(Continued)

FOREIGN PATENT DOCUMENTS

| | | | |
|---|---|---|---|
| CN | 10851346 A | * | 5/2018 |
| JP | 2008107139 A | | 5/2008 |

(Continued)

*Primary Examiner* — Russell Frejd
*Assistant Examiner* — Sara J Lewandroski
(74) *Attorney, Agent, or Firm* — Dorsey & Whitney LLP

(57) ABSTRACT

A gas sampling apparatus having a sampling film in a cartridge includes the cartridge configured to store and send the sampling film out, and the sampling film detachable from the cartridge, wherein the sampling film is configured to adsorb a target material and prevent disturbance between sampled target materials.

15 Claims, 12 Drawing Sheets

(51) Int. Cl.
*B64U 10/13* (2023.01)
*B64U 101/00* (2023.01)

(56) References Cited

U.S. PATENT DOCUMENTS

| | | | | |
|---|---|---|---|---|
| 6,985,818 | B1 * | 1/2006 | Samuels | G01N 15/0643 356/73 |
| 2010/0238447 | A1 * | 9/2010 | Hirsch | G01N 21/8483 356/437 |
| 2012/0115241 | A1 * | 5/2012 | Ho | G08B 21/12 422/68.1 |

FOREIGN PATENT DOCUMENTS

| | | |
|---|---|---|
| JP | 4809919 B2 | 8/2011 |
| KR | 20170024300 A | 3/2017 |
| KR | 101720695 B1 | 4/2017 |
| KR | 20170055046 A | 5/2017 |

* cited by examiner

APPARATUS FOR SAMPLING GAS, DRONE THEREWITH AND CONTROL METHOD THEREOF

CROSS REFERENCE TO RELATED APPLICATIONS

This application claims the benefit of priority of Korean Patent Application No. 10-2019-0166541 filed on 13 Dec. 2019 and Korean Patent Application No. 10-2019-0166539 filed on 13 Dec. 2019, both in the Korean Intellectual Property Office, the disclosures of which are incorporated herein by reference for all purposes.

BACKGROUND

1. Field

One or more example embodiments relate to an apparatus for sampling gas, a drone therewith, and a control method thereof.

2. Description of the Related Art

A chemical weapon is a toxic chemical agent or a weapon filled with the same. Chemical weapons are military hardware that directly uses chemical reactions for combat, such as flame throwing agents, incendiary agents, smokescreens, toxic gases, or luminescence generating agents, and specifically include gaseous materials such as adamsite, yperite, and phosgene. These toxic chemicals may interfere with pathways of neurotransmitters, invade the blood to cause chemical reactions, or induce suffocation.

Whether such a chemical weapon is diffused may be determined by collecting materials in the air and checking the concentrations and distribution locations of the collected materials. For example, it is necessary to apply the technology to defense articles such as automatic alarms for chemical, biological, and radiological (CBR) detection/alarming, CBR reconnaissance cars, portable chemical agent detection equipment, chemical-biological automatic detectors, and/or unmanned reconnaissance aerial vehicles used as unmanned aircraft.

The above description has been possessed or acquired by the inventor(s) in the course of conceiving the present invention and is not necessarily an art publicly known before the present application is filed.

SUMMARY

According to an aspect, there is provided a gas sampling apparatus having a sampling film in a cartridge, the gas sampling apparatus including the cartridge configured to store and send the sampling film out, and the sampling film detachable from the cartridge, wherein the sampling film may be configured to adsorb a target material and prevent disturbance between sampled target materials.

The sampling film may include a sampling section configured to adsorb a target material to be sampled, and a non-reaction section configured to not adsorb the target material to be sampled or not react with the target material to be sampled.

The sampling film may include an impermeable surface on the other side of a surface that is to be externally exposed.

The sampling section may include a plurality of sampling tapes arranged side by side in the sending-out direction of the sampling film and configured to adsorb the target material to be sampled.

The cartridge may be configured to store and send the sampling film out, and store the sampling film having sampled the target material in a manner that prevents disturbance between sampling sections.

The cartridge may include a first housing configured to store the sampling film yet to be used, a second housing configured to store the sampling film having sampled the target material, and a connector configured to expose one surface of the sampling film to the outside of the cartridge and block external exposure of the other surface of the sampling film as the sampling film is sent out, and to connect the second housing to the first housing.

The first housing may include a first sealing membrane provided at an outlet between the first housing and the connector to block the first housing from the outside.

The second housing may include a second sealing membrane provided at an inlet between the second housing and the connector to block the second housing from the outside.

The sampling film may include a disturbance preventing projection provided to protrude from the sampling film in a direction perpendicular to the sending-out direction of the sampling film, and configured to prevent disturbance between sampling sections.

The cartridge may include a sending-out roller configured to send out and externally expose the sampling film rolled up in the first housing, and a collecting roller configured to roll up and collect the exposed sampling film into the second housing, wherein the cartridge may be configured to store the sampling film having sampled the target material, rolled up around the collecting roller.

The cartridge may be configured to store the sampling film having sampled the target material, folded up in the form of zigzags.

The gas sampling apparatus may further include a coating part configured to provide a coating film to seal the adsorbed surface of the sampling film when the sampling film is collected from the outside into the cartridge.

The gas sampling apparatus may further include a motor configured to adjust the sending-out speed of the sampling film.

According to another aspect, there is provided a drone with a gas sampling apparatus having a sampling film in a cartridge, the drone including the cartridge configured to store and send the sampling film out, the sampling film provided in the cartridge, and a flying body configured to externally expose the sampling film, wherein the cartridge is attached thereto.

The drone may further include a position information sensor, and an information recording device, wherein the information received from the position information sensor may be recorded on the sampling film and transmitted to the gas sampling apparatus.

According to another aspect, there is provided a method of controlling a drone with a gas sampling apparatus, the method including receiving a gas sampling target position, moving the drone, sending out and exposing a sampling film, collecting and storing the sampling film, and matching position information and time information related to an area where the sampling film performs sampling.

The sampling film may include activated carbon fiber (ACF) fabric, fiber fabric with a metal-organic framework (MOF), fiber fabric with activated carbon, porous polymer, film-type fabric with a porous inorganic material, or an adsorptive polymer film.

The sampling film may further include reactive color-changing materials arranged side by side in the sending-out direction of the sampling film.

According to example embodiments, an apparatus for sampling gas may continuously test target materials without disturbance, and a drone with the apparatus may control detection and sampling of target materials in a target area at a predetermined time.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
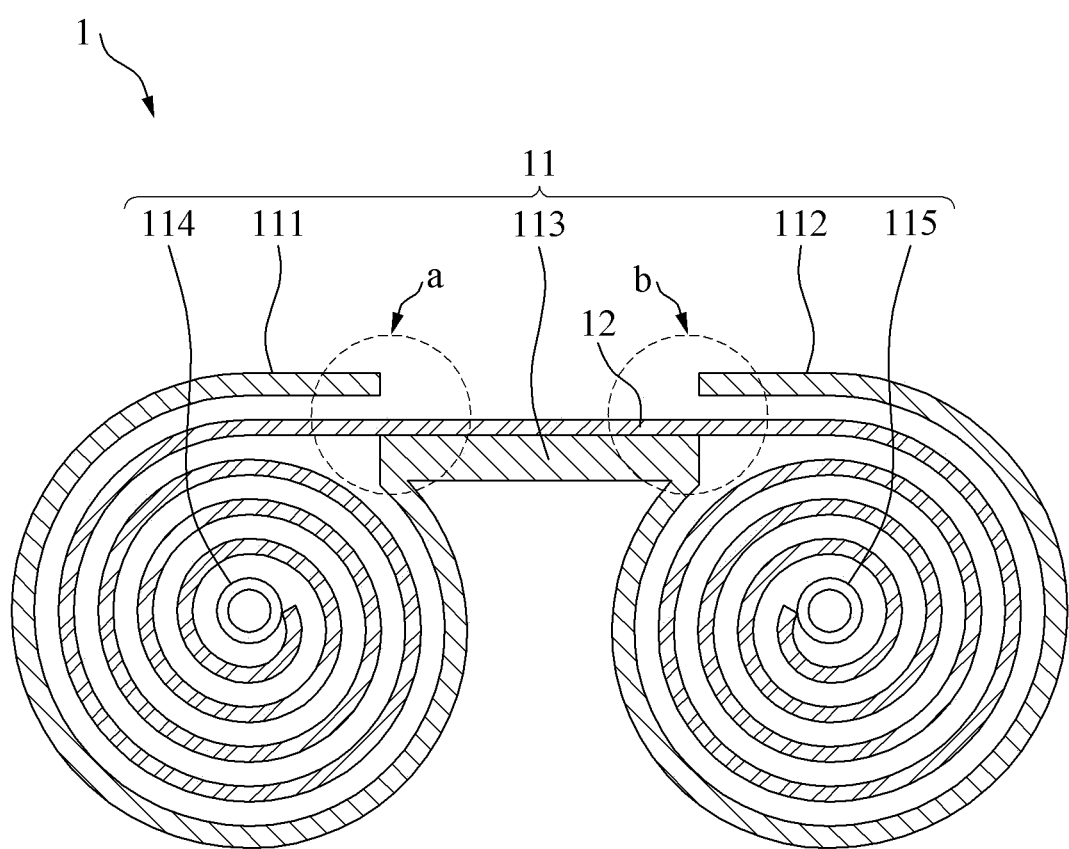
FIG. 1 illustrates a gas sampling apparatus according to an example embodiment.

Hereinafter, example embodiments of the present disclosure will be described with reference to the accompanying drawings. Regarding the reference numerals assigned to the components in the drawings, it should be noted that the same components will be designated by the same reference numerals, wherever possible, even though they are shown in different drawings. Also, in the description of the example embodiments, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

The same name may be used to describe an element included in the example embodiments described above and an element having a common function. Unless otherwise mentioned, the descriptions on the example embodiments may be applicable to the following example embodiments and thus, duplicated descriptions will be omitted for conciseness.

FIG. 1 illustrates a gas sampling apparatus according to an example embodiment.

Referring to FIG. 1, an apparatus 1 for sampling gas may continuously sample gaseous materials. For example, the apparatus 1 for sampling gas may be utilized for defense articles such as automatic alarms for chemical, biological, and radiological (CBR) detection/alarming, CBR reconnaissance cars, portable chemical agent detection equipment, chemical-biological automatic detectors, and/or reconnaissance unmanned aerial vehicles used as unmanned aircraft. For example, the apparatus 1 for sampling gas that adsorbs a gaseous material may be referred to as the "gas sampling apparatus". The gas sampling apparatus 1 may include a cartridge 11 and a sampling film 12 (hereinafter, also referred to as the "film"). For example, the film 12 that adsorbs and samples a gaseous material may be referred to as the "sampling film".

The cartridge 11 may accommodate the film 12 that is detachable therefrom, and store and send out the film 12. For example, the cartridge 11 may store the film 12 on one side, send the film 12 out from one side to the other side at a time when detection or sampling is needed, and store the film 12 having sampled a target material on the other side. The film 12 stored after the sampling operation may be detached from the cartridge 11 and passed through a gas analyzer to derive a precise analysis result for the target material in real time. Meanwhile, the cartridge 11 may store the film 12 having sampled the target material in a manner that prevents disturbance. For example, the cartridge 11 may have a structure that prevents materials adsorbed on the film 12 from moving and mixing with each other. The cartridge 11 may include a first housing 111, a second housing 112, a connector 113, a sending-out roller 114, and a collecting roller 115.

The first housing 111 may store the film 12 yet to be used, and the second housing 112 may store the film 12 having sampled the target material.

The connector 113 may expose one surface of the film 12 to the outside of the cartridge 11 and block external exposure of the other surface of the film 12 as the film 12 is sent out, and connect the second housing 112 to the first housing 111.

The sending-out roller 114 may send out and externally expose the film 12 rolled up in the first housing 111, and the collecting roller 115 may collect the exposed film 12 by rolling up the film 12 in the second housing 112. The collecting roller 115 may store the film 12 having sampled the target material by rolling up the film therearound. For example, the sending-out roller 114 and/or the collecting roller 115 may include a motor, and the sending-out speed and the collecting speed may be adjusted by a controller 73 (see FIG. 9).

The film 12 may adsorb the target material. For example, the film 12 may include, if being a sampling film, activated carbon fiber (ACF) fabric, fiber fabric with a metal-organic framework (MOF), fiber fabric with activated carbon, porous polymer, film-type fabric with a porous inorganic material, or an adsorptive polymer film as a material capable of adsorbing a gaseous material, and may also include various adsorptive materials not limited thereto. Further, the film 12 may include, if being a detection film, a material that changes color according to a characteristic of the gaseous material. Meanwhile, the film 12 may prevent disturbance between sampled target materials.

Figure 2:
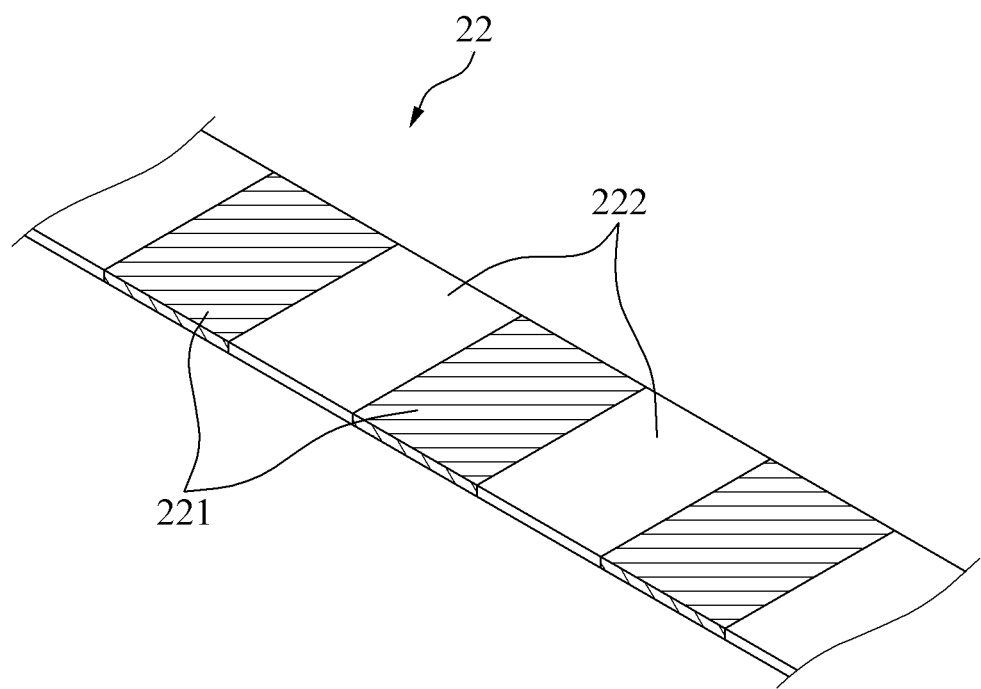
FIG. 2 illustrates a sampling film according to an example embodiment.

FIG. 2 illustrates a film according to an example embodiment.

Referring to FIG. 2, a film 22 may include a reaction section 221 configured to adsorb or sample a target material to be sampled, and a non-reaction section 222 configured to not adsorb the target material or not react with the target material. The reaction section 221 may be referred to as the "sampling section" depending on the function thereof. For example, the reaction section 221 and the non-reaction section 222 may include different materials. The reaction section 221 may include various adsorptive materials described above, and the non-reaction section 222 may include a material having a lower adsorbability than the reaction section 221 or a non-adsorptive material. By the above structure, it is possible to expose the reaction section 221 after arriving at a test position for sampling gas, and to prevent the reaction section 221 from being exposed during movement from the test position to another test position. Therefore, it is possible to reduce cross-contamination caused by movements between the sampled materials in the film 22 having completed detection or sampling.

Figure 3:
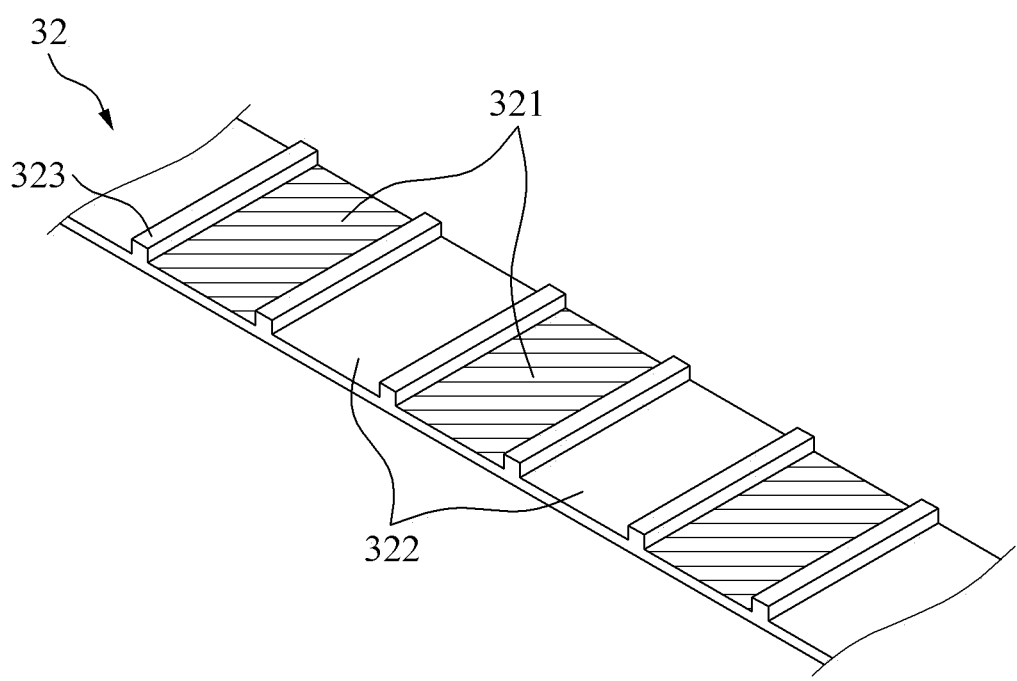
FIG. 3 illustrates a sampling film according to an example embodiment.

FIG. 3 illustrates a film according to an example embodiment.

Referring to FIG. 3, a film 32 may include a reaction section 321, a non-reaction section 322, and a disturbance preventing projection 323.

The disturbance preventing projection 323 may be provided to protrude from the film 32 in a direction perpendicular to the sending-out direction of the film 32. The disturbance preventing projection 323 may prevent disturbance between sampled materials. In addition, the disturbance preventing projection 323 may be in contact with a first housing 311 and a second housing 312, thereby separating the inside and the outside of the first housing 311 and the inside and the outside of the second housing 312, which will be described further with reference to FIG. 6. Therefore, the disturbance preventing effect may significantly improve.

Figure 4:
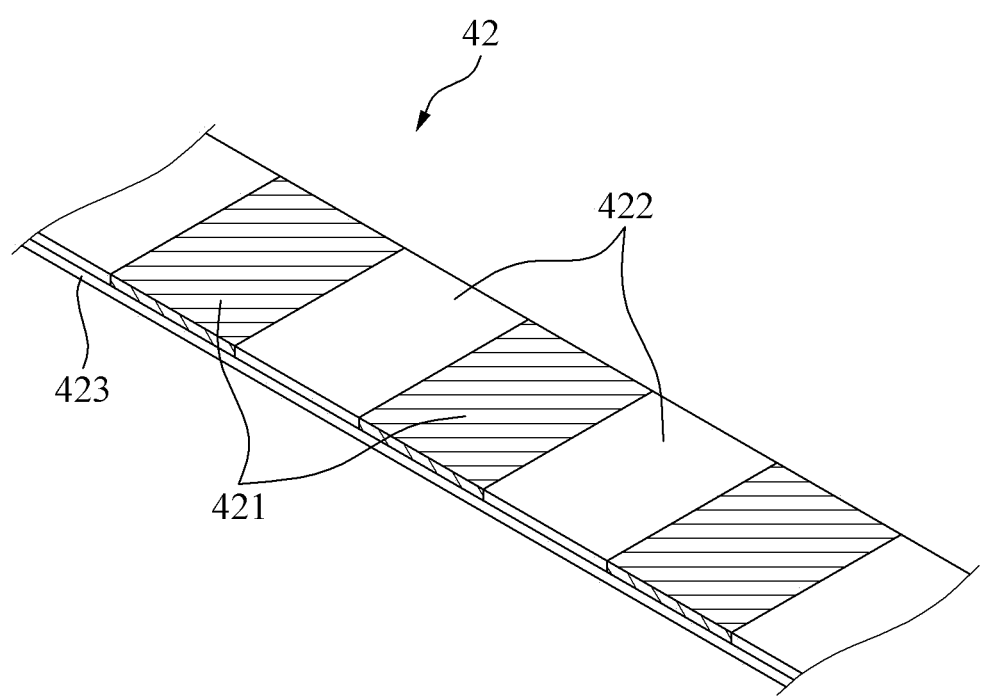
FIG. 4 illustrates a sampling film according to an example embodiment.

FIG. 4 illustrates a film according to an example embodiment.

Referring to FIG. 4, a film 42 may include a reaction section 421, a non-reaction section 422, and an impermeable surface 423.

The impermeable surface 423 may be provided on the other side of a surface that is externally exposed. For example, in the case of storing the film 42 having sampled, the film 42 may be in contact with the previously stored film 42 having sampled, in the second housing 112 (see FIG. 1). Such contact may cause sampled materials to be mixed and may impede accurate analysis results. The impermeable surface 423 may prevent movement of a material sampled through one surface of the film 42 having sampled.

Figure 5:
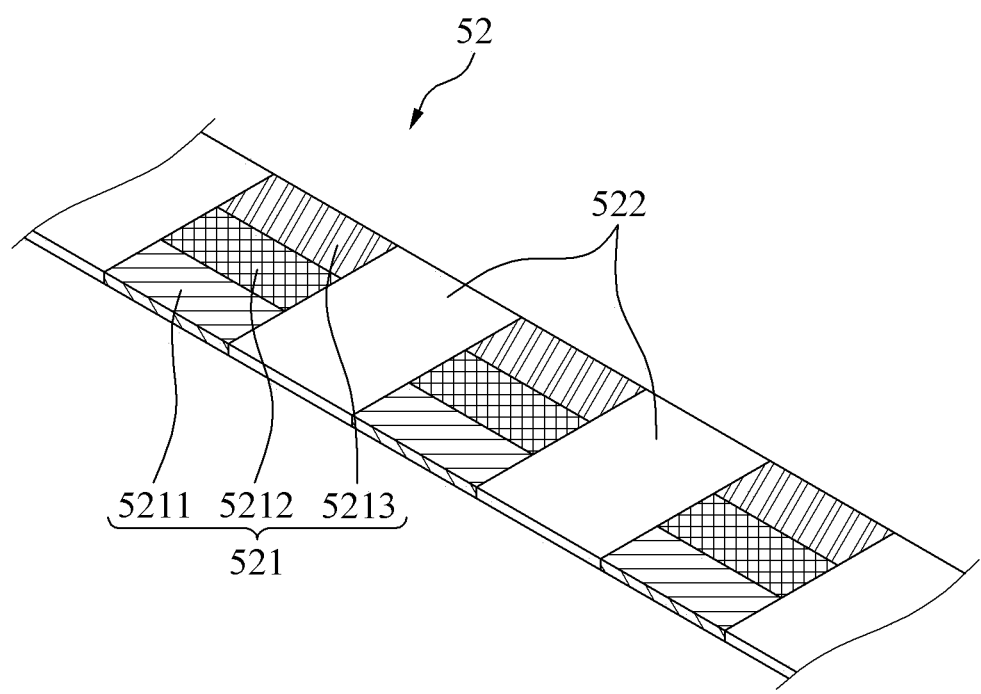
FIG. 5 illustrates a sampling film according to an example embodiment.

FIG. 5 illustrates a film according to an example embodiment.

Referring to FIG. 5, a film 52 may include a reaction section 521 and a non-reaction section 522, wherein the sampling section 521 may include a plurality of sampling tapes arranged side by side in the sending-out direction of the film 52 and configured to adsorb a target material to be sampled. In addition, the film 52 may further include reactive color-changing materials arranged side by side in the sending-out direction of the film 52 and provided in parallel with the plurality of adsorptive sampling tapes. For example, gas detection materials may be arranged side by side together with sampling tapes in the sending-out direction of the film 52, as shown in a first section 5211, a second section 5212, and a third section 5213. By the above structure, it is possible to visually confirm the presence of a target material (predetermined gas) depending on whether the film 52 changes the color and to perform sampling at the same time. In other words, by simultaneously implementing different functions of adsorption and color change (detection) characteristics, gas sampling and detection for each section may be performed at the same time. Therefore, it is possible to analyze the concentrations and characteristics of different types of materials in various manners at the same time.

Figure 6A:
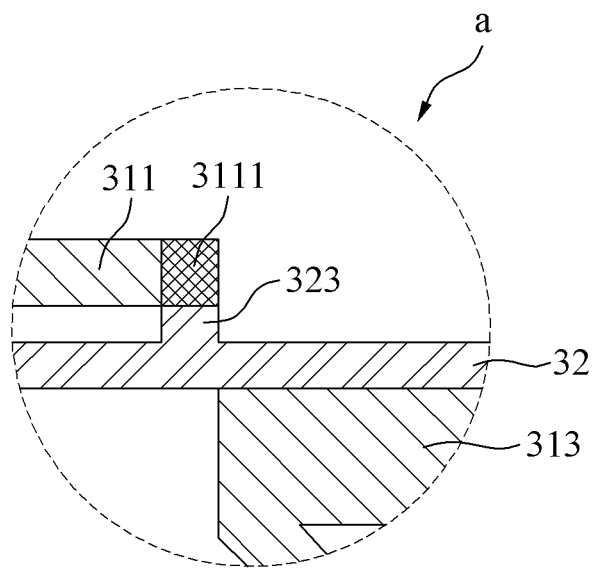
FIG. 6A is a partially enlarged view of the portion a of FIG. 1.
Figure 6B:
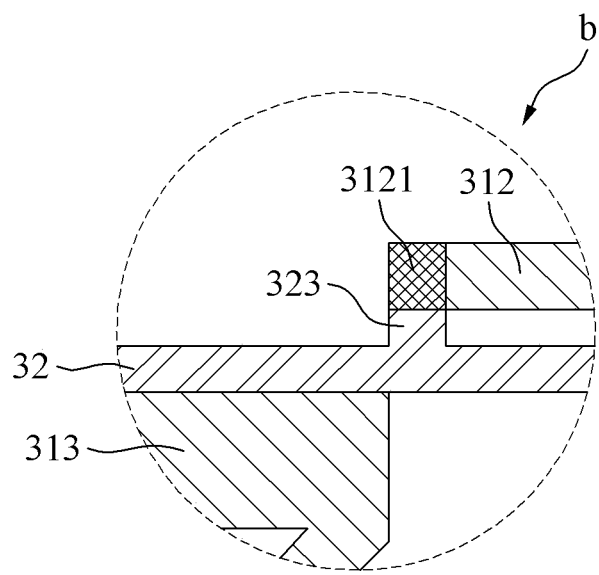
FIG. 6B is a partially enlarged view of the portion b of FIG. 1.

FIG. 6A is a partially enlarged view of the portion a of FIG. 1, and FIG. 6B is a partially enlarged view of the portion b of FIG. 1.

Referring to FIG. 6A, the first housing 311 may include a first sealing membrane 3111. The first sealing membrane 3111 may be provided at an outlet between the first housing 311 and a connector 313. Referring to FIG. 6B, the second housing 312 may include a second sealing membrane 3121. The second sealing membrane 3121 may be provided at an inlet between the second housing 312 and the connector 313. Meanwhile, the film 32 may include the disturbance preventing projection 323 provided to protrude from the film 32 in a direction perpendicular to the sending-out direction of the film 32. By the above structure, two disturbance preventing projections 323 may be in contact with the first sealing membrane 3111 and the second sealing membrane 3121, respectively, thereby separating the first housing 311 and the second housing 312 from the outside while the film 32 positioned on the connector 313 is externally exposed. Through the sealed structure as described above, it is possible to efficiently reduce the issue that a target material enters an area other than the exposed film 32, even when the film 32 is exposed for a long time.

Figure 7:
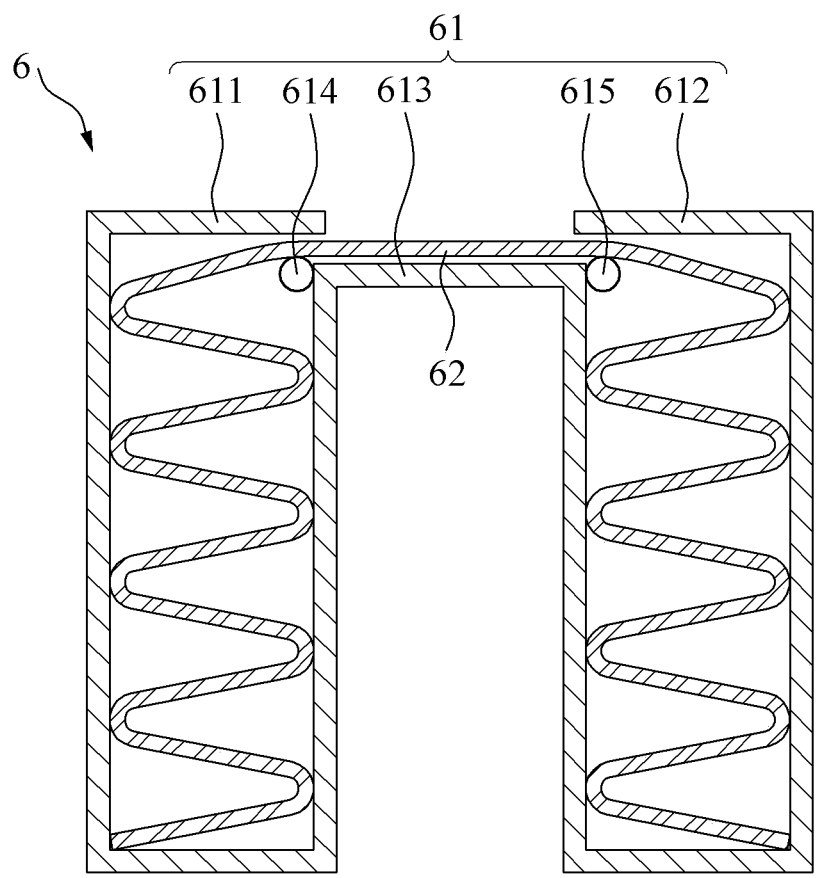
FIG. 7 illustrates a gas sampling apparatus according to an example embodiment.

FIG. 7 illustrates a gas sampling apparatus according to an example embodiment.

Referring to FIG. 7, a gas sampling apparatus 6 may include a cartridge 61, and a film 62, wherein the cartridge 61 may include a first housing 611, a second housing 612, a connector 613, a sending-out roller 614, and a collecting roller 615.

The cartridge 61 may store the film 62 having sampled a target material by folding up the film 62 in the form of zigzags. The film 62 yet to be used may be stored folded up in the first housing 611.

The sending-out roller 614 may send the film 62 out from the first housing 611 to the connector 613. The sending-out roller 614 may be provided on one surface of the first housing 611 that meets the connector 613. Meanwhile, to prevent the film 62 from contacting an inner wall of the first housing 611, sending-out rollers 614 may be provided on both sides of the film 62, respectively.

The collecting roller 615 may collect the film 62 from the first housing 611 and the connector 613 into the second housing 612. The collecting roller 615 may be positioned on one surface of the second housing 612 that meets the connector 613. Meanwhile, to prevent the film 62 from contacting an inner wall of the second housing 612, collecting rollers 615 may be provided on both sides of the film 62, respectively.

Figure 8:
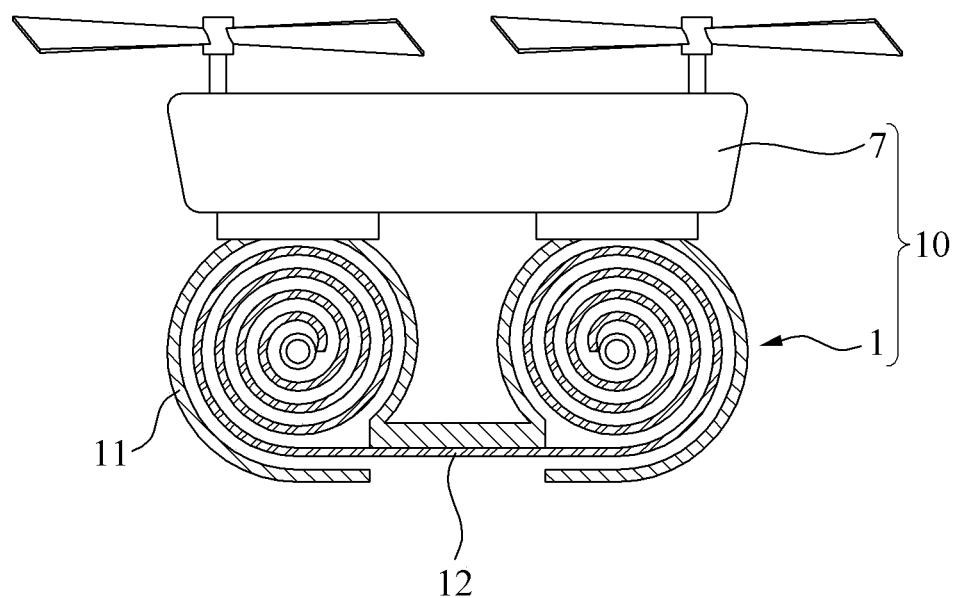
FIGS. 8 and 9 illustrate drones with gas sampling apparatuses according to example embodiments.
Figure 9:
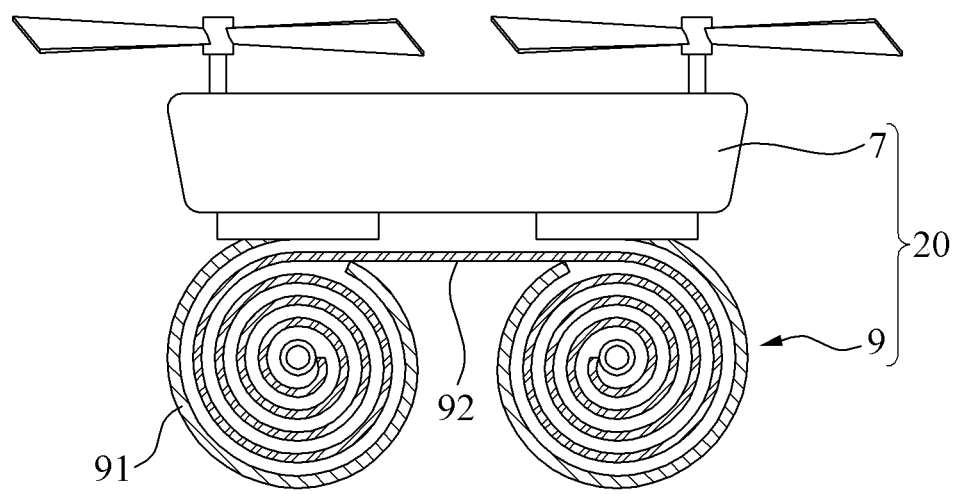
Figure 10:
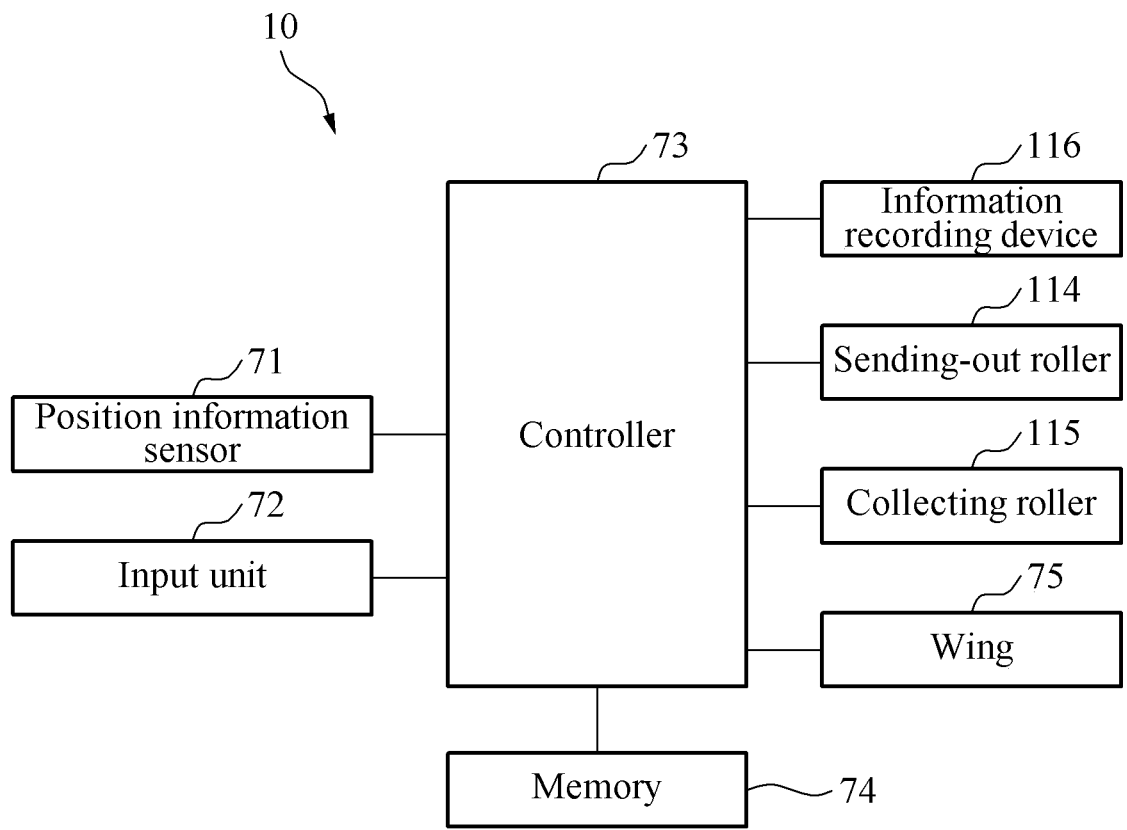
FIG. 10 is a block diagram illustrating a drone with a gas sampling apparatus according to an example embodiment.

FIGS. 8 and 9 illustrate drones with gas sampling apparatuses according to an example embodiment, and FIG. 10 is a block diagram illustrating a drone with a gas sampling apparatus according to an example embodiment.

Referring to FIGS. 8 to 10, a drone 10 may sample a gaseous material at a set time at set altitude and area. For example, the drone 10 may include a flying body 7, and the gas sampling apparatus 1 attached to the flying body 7.

The flying body 7 may include a position information sensor 71, an input unit 72, a controller 73, a memory 74, and a wing 75.

The position information sensor 71 may include a global positioning system (GPS) receiver, a Wi-Fi or Bluetooth-based beacon that is applicable in a short range, and a sensor configured to detect a position of the flying body 7 based on a mobile communication network.

The input unit 72 may receive information such as a target position and a time from the outside. For example, the input unit 72 may be construed as including various wireless communication devices configured to receive instructions or information from a user or a terminal. In addition, before the drone 10 is flown, the input unit 72 may directly receive information without wireless communication.

The controller 73 may control the wing 75 of the flying body 7 based on sampling plan information received from the input unit 72, and drive the sending-out roller 114 or the collecting roller 115 at a set speed. In addition, position information received from the position information sensor 71 may be recorded on the film 12 by the information recording device 116. The controller 73 may transmit related information including the position information and time information to the gas sampling apparatus 1.

The gas sampling apparatus 1 may include the cartridge 11 and the film 12, wherein the cartridge 11 may include the first housing, the second housing, the connector, the sending-out roller 114, the collecting roller 115, and an information recording device 116.

For example, the cartridge 11 may be attached to the bottom of the flying body 7, as shown in FIG. 8. In addition, to minimize the effect of the flow of air flowed by the wing 75 on the film 12 or to improve the efficiency of exposing the film 12 to gas, the film 12 may be provided to be exposed downward relatively to the flying body 7. Meanwhile, the form of the gas sampling apparatus 1 connected to the flying body 7 is not necessarily limited to the example of FIG. 8. For example, referring to FIG. 9, a drone 20 may include a flying body 7 and a gas sampling apparatus 9, wherein the gas sampling apparatus 9 may include a cartridge 91 and a film 92 that are arranged in a form different from the form shown in FIG. 8.

The sending-out roller 114 or the collecting roller 115 may include a motor configured to adjust the sending-out or collecting speed of the film 12.

Figure 11:
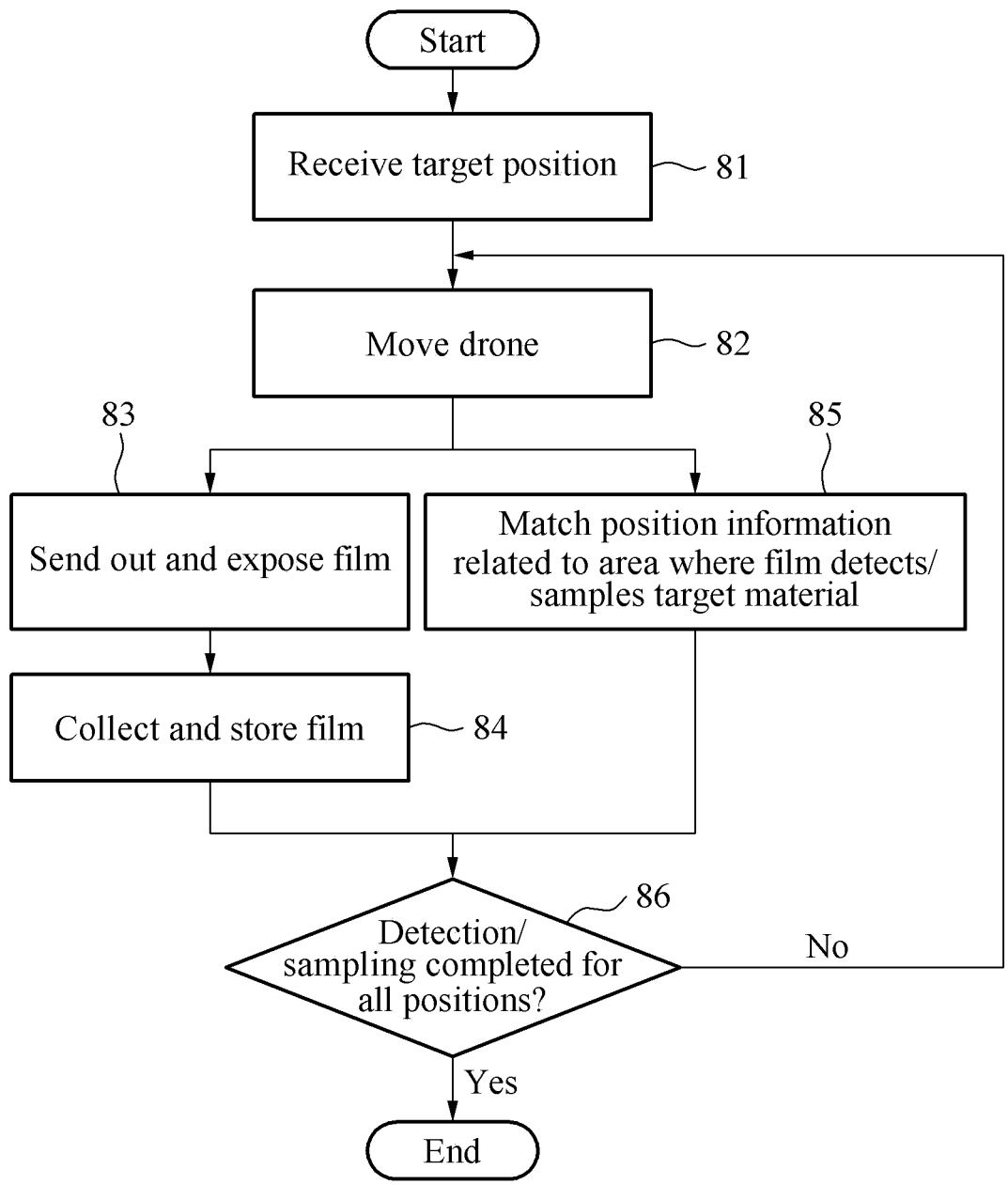
FIG. 11 is a flowchart illustrating a method of controlling a drone with a gas sampling apparatus according to an example embodiment.

FIG. 11 is a flowchart illustrating a method of controlling a drone with a gas sampling apparatus according to an example embodiment.

Referring to FIG. 11, a method of controlling the drone 10 may include operation 81 of receiving a target position, operation 82 of moving the drone, operation 83 of sending out and exposing the film 12, operation 84 of collecting and storing the film 12, operation 85 of matching position information and time information related to an area where the film performs sampling, and operation 86 of verifying whether sampling is completed at all target positions.

In operation 81, the input unit 72 may receive target position and time information. For example, the input unit 72 may receive sampling conditions such as a sampling count or frequency together.

In operation 82, the controller 73 may compare the target position received by the input unit 72 to current position information collected by the position information sensor 71, and move the drone 10 to the target position by driving the wing 75 if the current position does not match the target position. For example, if the current position of the drone 10 does not match the target position, the controller 73 may expose the non-reaction section 222 of the film 22 to the outside.

In operations 83 and 84, the gas sampling apparatus 1 may drive the sending-out roller 114 or the collecting roller 115 through the controller 73. Based on the time information received through the input unit 72, the sending-out roller 114 may send the film 12 out, the film 12 sent out may sample a gaseous material, and the collecting roller 115 may collect the film 12 having sampled. Meanwhile, the reaction section 221 and the non-reaction section 222 of the film 22 may have the same width, wherein the controller 73 may control the exposure of the reaction section 221 or the non-reaction section 222 by sending the film 22 out as much as the section width, and may recognize whether a section exposed to the outside is the reaction section 221 or the non-reaction section 222. For example, when the drone 10 arrives at the target position received in operation 81, the controller 73 may externally expose the reaction section 221 by sending the film 22 out by the width of each section. Meanwhile, alternatively, the controller 73 may verify whether the reaction section 221 is externally exposed or the non-reaction section 222 is, by sensing whether the disturbance preventing projection 323 of the film 32 is in contact with the sealing membrane 3111 of the cartridge 11 or the inlet of the cartridge 11. For example, to sense whether there is a contact, a pressure sensor or a capacitive sensor may be used, but is not limited to, and all types of sensors capable of determining whether there is a contact may be applicable thereto.

In operation 85, the position information collected by the position information sensor 71 may be matched to the position information related to the area where the film 12 samples a target material and/or to the time information, and the matched information may be stored in the memory 74. In the future, a user may obtain position information for each section of the film 12 based on the information stored in the memory 74, such that the user may not need to record the collection positions and the collection order one by one in the collection process. Although it is shown in FIG. 11 that operation 85 is performed in parallel with operations 83 and 84, operation 85 may be performed between operation 82 and operation 83 or between operation 84 and operation 86.

In operation 86, whether detection or sampling is completed for all target positions may be verified. If detection or sampling is not performed yet for all target positions, operation 82 may be performed again to move the drone to another target position and sample the target material. If sampling is performed for all target positions, the control method is terminated.

Figure 12:
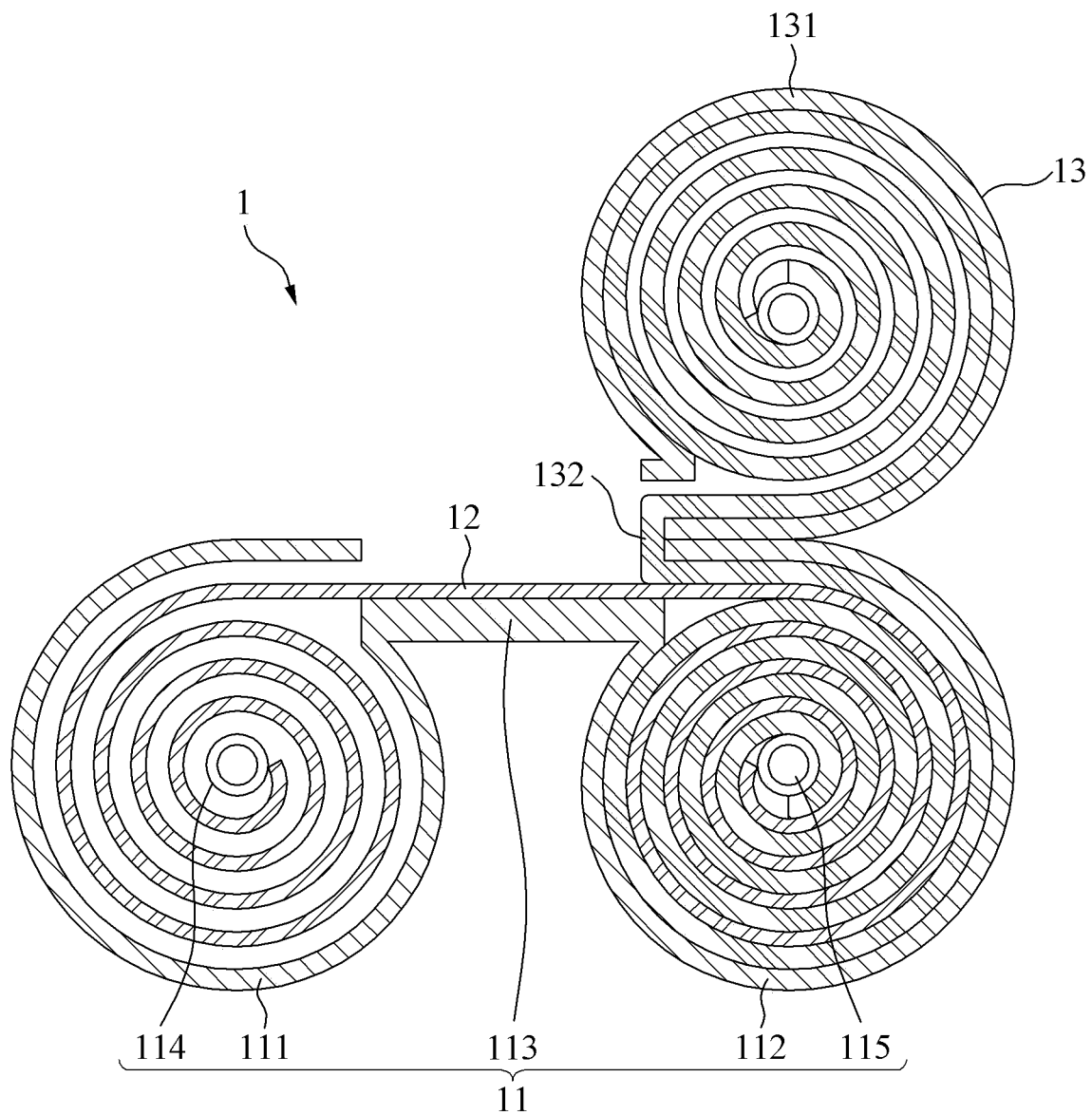
FIG. 12 illustrates a gas sampling apparatus according to an example embodiment.

FIG. 12 illustrates a gas sampling apparatus according to an example embodiment.

Referring to FIG. 12, the gas sampling apparatus 1 may include the cartridge 11, the film 12, and a coating part 13. The coating part 13 may include a third housing 131 and a coating film 132.

The coating film 132 may seal the adsorbed surface of the film 12 when the film 12 is collected from the first housing 111 into the second housing 112 along the connector 113. For example, the coating film 132 may include acrylic resin or polymeric resin, but is not limited thereto, and may include all materials that may form a sealed structure when compressed by the film 12 or in contact with the film 12. In addition, the coating film 132 may be thermoplastic and thermoformable and may form a sealed structure with the disturbance preventing projection 323 (see FIG. 3) of the film 12 when compressed at the inlet between the second housing 112 and the connector 113.

The third housing 131 may store the coating film 132 therein, and send the coating film 132 out by means of a driving device such as a coating roller provided therein, at a speed the same as the speed at which the film 12 is collected. Meanwhile, the drive may be physically performed by a frictional force between the coating film 132 and the film 12, as well as the control by an electrical signal.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents.

What is claimed is:

1. A method of controlling a drone with a gas sampling apparatus, the method comprising
    receiving a gas sampling target position;
    moving the drone;
    sending out and exposing a sampling film;
    collecting and storing the sampling film; and
    matching position information and time information related to an area where the sampling film performs sampling,
    wherein the gas sampling apparatus comprises a cartridge configured to store and send out the sampling film, the cartridge comprising:
        a first housing configured to store the sampling film yet to be used;
        a second housing configured to store the sampling film having sampled a target material; and
        a connector configured to expose one surface of the sampling film to the outside of the cartridge and block external exposure of the other surface of the sampling film as the sampling film is sent out, and to connect the second housing to the first housing.

2. The method of claim 1, wherein the sampling film comprises
    a sampling section configured to adsorb the target material to be sampled; and
    a non-reaction section configured to not adsorb the target material to be sampled or not react with the target material to be sampled.

3. The method of claim 2, wherein the sampling section comprises a plurality of sampling tapes arranged side by side in the sending-out direction of the sampling film and configured to adsorb the target material to be sampled.

4. The method of claim 3, wherein the sampling film further comprises reactive color-changing materials arranged side by side in the sending-out direction of the sampling film.

5. The method of claim 1, wherein the cartridge is configured to store and send the sampling film out, and store the sampling film having sampled the target material in a manner that prevents disturbance between sampling sections.

6. The method of claim 1, wherein the sampling film comprises an impermeable surface on the other side of a surface that is to be externally exposed.

7. The method of claim 1, wherein the first housing comprises a first sealing membrane provided at an outlet between the first housing and the connector to block the first housing from the outside.

8. The method of claim 1, wherein the second housing comprises a second sealing membrane provided at an inlet between the second housing and the connector to block the second housing from the outside.

9. The method of claim 1, wherein the sampling film comprises a disturbance preventing projection provided to protrude from the sampling film in a direction perpendicular to the sending-out direction of the sampling film, and configured to prevent disturbance between sampling sections.

10. The method of claim 1, wherein the cartridge comprises
    a sending-out roller configured to send out and externally expose the sampling film rolled up in the first housing; and
    a collecting roller configured to roll up and collect the exposed sampling film into the second housing,
    wherein the cartridge is configured to store the sampling film having sampled the target material, rolled up around the collecting roller.

11. The method of claim 1, wherein the cartridge is configured to store the sampling film having sampled the target material, folded up in the form of zigzags.

12. The method of claim 1, wherein the sampling film further comprises a coating part configured to provide a coating film to seal an adsorbed surface of the sampling film when the sampling film is collected from the outside into the cartridge.

13. The method of claim 1, wherein the drone further comprises a motor configured to adjust the sending-out speed of the sampling film.

14. The method of claim 1, wherein the sampling film includes activated carbon fiber (ACF) fabric, fiber fabric with a metal-organic framework (MOF), fiber fabric with activated carbon, porous polymer, film-type fabric with a porous inorganic material, or an adsorptive polymer film.

15. The method of claim 1, wherein the drone further comprises
    a position information sensor; and
    an information recording device,
    wherein the information received from the position information sensor is recorded on the sampling film and transmitted to the gas sampling apparatus.

* * * * *